(12) United States Patent
Subramanya et al.

(10) Patent No.: US 8,666,749 B1
(45) Date of Patent: Mar. 4, 2014

(54) SYSTEM AND METHOD FOR AUDIO SNIPPET GENERATION FROM A SUBSET OF MUSIC TRACKS

(71) Applicant: Google Inc., Mountain View, CA (US)

(72) Inventors: Amarnag Subramanya, Sunnyvale, CA (US); Jennifer Gillenwater, Philadelphia, PA (US); Garth Griffin, Somerville, MA (US); Fernando Pereira, Menlo park, CA (US); Douglas Eck, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/744,222

(22) Filed: Jan. 17, 2013

(51) Int. Cl.
*G10L 11/00* (2006.01)

(52) U.S. Cl.
USPC ........... 704/270; 704/272; 704/276; 704/277; 704/278; 704/500

(58) Field of Classification Search
USPC ................. 704/270, 272, 276, 277, 278, 250
See application file for complete search history.

(56) References Cited

U.S. PATENT DOCUMENTS

| | | | | |
|---|---|---|---|---|
| 6,225,546 B1 * | 5/2001 | Kraft et al. | ............... | 84/609 |
| 7,386,357 B2 * | 6/2008 | Zhang | ............... | 700/94 |
| 7,522,967 B2 | 4/2009 | Zhang et al. | | |
| 7,826,911 B1 * | 11/2010 | Bennett | ............... | 700/94 |
| 8,326,880 B2 * | 12/2012 | Carson et al. | ............... | 707/791 |
| 2008/0187231 A1 | 8/2008 | Barbieri et al. | | |
| 2011/0055022 A1 * | 3/2011 | Mehta et al. | ............... | 705/14.71 |

OTHER PUBLICATIONS

Campbell, Spencer, "Automatic Key Detection of Musical Excerpts from Audio", *Music Technology Area, Department of Music Research, Schulich School of Music*, McGill University, Montreal, Canada (Aug. 2010) (127 pages total).

Kulesza, John A., "Learning with Determinantal Point Processes", *Presented to the Faculties of the University of Pennsylvania in Partial Fulfillment of the Requirements for the Degree of Doctor of Philosophy*, (2012), (Part 1, 51 pages total).

Kulesza, John A., "Learning with Determinantal Point Processes", *Presented to the Faculties of the University of Pennsylvania in Partial Fulfillment of the Requirements for the Degree of Doctor of Philosophy*, (2012), (Part 2, 40 pages total).

Kulesza, John A., "Learning with Determinantal Point Processes",*Presented to the Faculties of the University of Pennsylvania in Partial Fulfillment of the Requirements for the Degree of Doctor of Philosophy*, (2012), (Part 3, 51 pages total).

Kulesza, John A., "Learning with Determinantal Point Processes", *Presented to the Faculties of the University of Pennsylvania in Partial Fulfillment of the Requirements for the Degree of Doctor of Philosophy*, (2012), (Part 4, 47 pages total).

Weston, Jason, et al., "Large-Scale Music Annotation and Retrieval: Learning to Rank in Joing Semantic Spaces", *Journal of New Music Research*, (May 26, 2011) (16 pages total).

* cited by examiner

*Primary Examiner* — Qi Han
(74) *Attorney, Agent, or Firm* — Leydig, Voit & Mayer, Ltd.

(57) ABSTRACT

The disclosure includes a system and method for generating audio snippets from a subset of audio tracks. In some embodiments an audio snippet is an audio summary of a group or collection of songs.

14 Claims, 7 Drawing Sheets

SYSTEM AND METHOD FOR AUDIO SNIPPET GENERATION FROM A SUBSET OF MUSIC TRACKS

BACKGROUND

A growing number of services provide large collections of music over the Internet. As more and more artists create music, the sizes of these collections continue to grow. Users of these musical services frequently discover artists and genres that they were previously unaware of. In these cases, it may be difficult and time consuming to gauge whether a particular artist or genre is preferable to the user, which may influence the user's decisions, e.g., to purchase the artist's music.

For instance, some artists have extensive collections of musical works that span large periods of time and a variety of musical styles. When such an artist is newly discovered by a user of the music service, the volume and diversity of the artist's work makes it difficult to quickly and efficiently assess the artist. Generally, the user must select and listen to a large number of songs to determine whether the user is interested in the particular artist. Thus, a need exists for a system and method for automatically and intelligently generating an audio summary from a group or collection of songs, or other audio files.

SUMMARY

An example embodiment describes a method for generating audio snippets comprising: generating a histogram for each audio file in a plurality of audio files, the histograms representing audio features of the plurality of audio files; determining stylistic similarity data for each of the plurality of audio files by applying a supervised learning model to each histogram; associating an audio identifier of each audio file with the respective stylistic similarity data determined for the audio file; storing the stylistic similarity data for each of the plurality of audio files; selecting a subset of audio files from the plurality of audio files, wherein the subset identifies most diverse and most popular audio files in the plurality of audio files; extracting an audio segment from each audio file in the subset of audio files; and combining the audio segments into an audio snippet.

Each audio file in the plurality of audio files may comprise data representing music. The stylistic similarity data for each of the plurality of audio files may comprise musical stylistic similarity data. Each audio file in the plurality of audio files may be associated with a specific musical artist. The plurality of audio files may be a user defined playlist.

Another example embodiment describes a method for generating an audio snippet comprising segments of audio files having one or more common attributes in order to provide a listener of the audio snippet with a range of features within the common one or more attributes, the method comprising: extracting features from a plurality of audio files having at least one common attribute; determining similarities among the plurality of audio files from the extracted features; grouping the plurality of audio files from the determined similarities; selecting audio files from the group to create a subset of audio files; and generating an audio snippet from the subset of audio files comprising one or more segments of each audio file in the subset.

Determining similarities among the plurality of audio files from the extracted feature may comprise generating similarity data for each audio file in the plurality of audio files, the similarity data indicating musical stylistic similarities between each audio file in the plurality of audio files and each other audio file in the plurality of audio files. Grouping the plurality of audio files from the determined similarities may comprise associating each audio file with the respective similarity data generated for the audio file. The similarity data may be a similarity matrix.

Selecting audio files from the group to create the subset of audio files may comprise selecting a most diverse and highest quality subset of audio files. Quality of an audio file may be associated with a measure of popularity of the audio file.

Generating the audio snippet from the subset of audio files may comprise extracting an audio segment from each audio file in the subset of audio files and concatenating the extracted audio segments into the audio snippet.

The method of this embodiment may further comprise detecting a musical event in each audio file in the subset of audio files; and extracting an audio segment from each audio file based on the detected musical event.

Another example embodiment describes a system for generating audio snippets comprising: a storage device storing a plurality of audio files; and a snippet generator configured to: extract features from a plurality of audio files; determine similarities from the extracted features; associate each audio file with the determined similarities; select a subset of audio files from the plurality of audio files; and generate an audio snippet from the subset of audio files.

The system may further comprise a database, comprising the storage device, connected to a network; a server, hosting the snippet generator, connected to the network and accessing the database through the network; and a client device configured to connect to the network and request generation of the audio snippet by displaying a graphical user interface and receiving input.

Determining similarities from the extracted features may comprise generating similarity data for each audio file in the plurality of audio files, the similarity data indicating musical stylistic similarities between each audio file in the plurality of audio files and each other audio file in the plurality of audio files. Associating each audio file with the determined similarities may comprise associating each audio file with the respective similarity data generated for the audio file.

Selecting the subset of audio files from the plurality of audio files may comprise selecting a most diverse and highest quality subset of audio files. Quality of an audio file may be associated with a measure of popularity of the audio file.

Generating the audio snippet from the subset of audio files may comprise extracting an audio segment from each audio file in the subset of audio files and concatenating the extracted audio segments into the audio snippet.

The snippet generator may be further configured to: detect a musical event in each audio file in the subset of audio files, and extract an audio segment from each audio file based on the detected musical event.

These and other features of example embodiments are disclosed herein below.

DETAILED DESCRIPTION OF EXAMPLE EMBODIMENTS

A system and method for generating a sequence of short (temporally) music samples taken from a group of songs or tracks is described in this disclosure. The sequence—sometimes referred to as an audio summary or an audio snippet—may quickly and efficiently present a summary of the songs. The music samples in the sequence are intelligently selected to present a diverse and high quality summarization of the group of songs. In some cases, the group of songs is the collective musical works of particular artist, and the audio summary aids a listener's understanding of the musical styles and genres employed by the artist over the artist's career. These and other aspects of the disclosure are discussed below.

Figure 1:
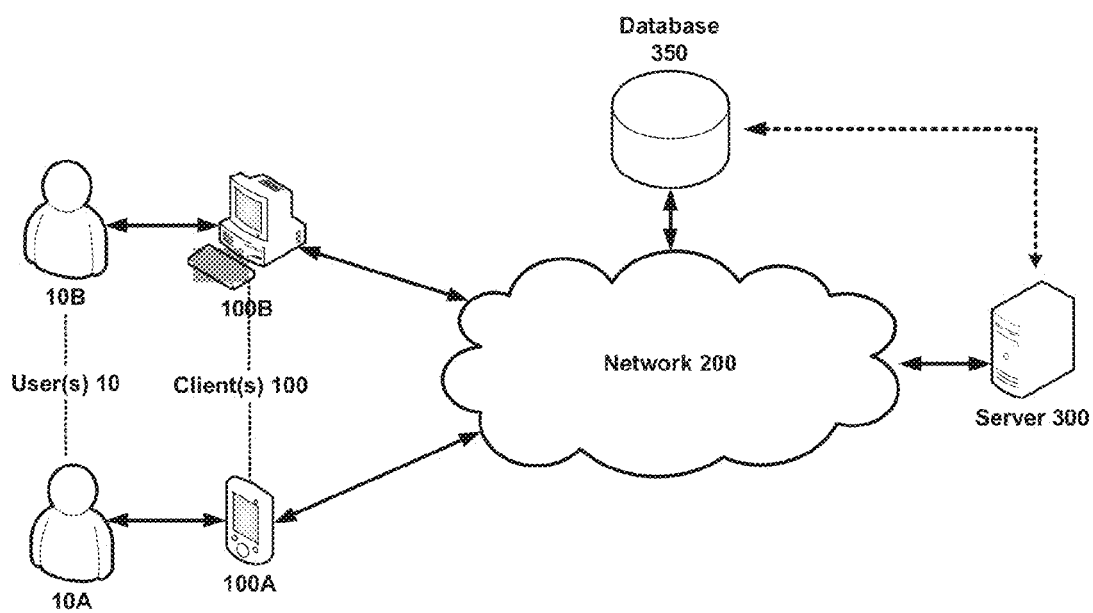
FIG. 1 is a block diagram of an example environment supporting the generation of audio snippets.

FIG. 1 illustrates an example environment supporting the generation of audio snippets. The illustrated environment is presented as an example, and does not represent or imply limitation regarding generating audio snippets in other appropriate environments. To the contrary, the description contemplates all implementations of systems and/or environments that support the generation of audio snippets from a subset of audio files.

Turning to FIG. 1, the environment includes one or more clients 100—such as clients 100A and 100B—a network 200, a database 350, and a server 300. Each client 100, the database 350, and the server 300 is connected to or configured to connect to the network 200. Once connection to the network 200 is established, the various devices illustrated in FIG. 1 are enabled to send and receive data, communicate, etc. For example, one or more users 10—such as users 10A and 10B—interacts with clients 100 connected to the network 200 to send and receive data, communicate, and the like with the server 300. As another example, the server 300 transmits data to and receives data from the database 350 through the network 200. In some embodiments, the server 300 and the database 350 are connected by a mechanism other than the network 200 (illustrated by the dashed arrow in FIG. 1), such as by a dedicated wire connection (e.g., universal serial bus (USB)). Additionally, while the environment of FIG. 1 illustrates two clients, one database, and one server coupled to the network 200, the system is not limited thereto and may support any number (hundreds, thousands, millions, billions, etc.) of clients, databases, and/or servers.

Clients 100A and 100B may be, but are not limited to, portable, mobile, and/or stationary devices such as landline telephones, mobile telephones (including "smart phones"), laptop computers, tablet computers, desktop computers, personal digital assistants (PDAs), portable gaming devices, portable media players, e-book readers, and the like. In some embodiments, two or more clients include similar communications mechanisms. For example, clients 100A and 100B may both be mobile telephones. In other embodiments, two or more clients are different types of devices. For example, client 100A may be a mobile telephone and client 100B may be a desktop computer or other device residing on and powered by programmed logic circuits. In this way, various electronic devices supporting diverse functionality can interact within the environment. As should be apparent to the skilled artisan, the client 100B may include the same or different components, applications, and functionality as the client 100A.

The network 200 of FIG. 1 may be any network supporting the exchange of data between one or more devices. Examples of the network 200 include, but are not limited to, a wired network, a wireless network, the Internet, a cellular data network, a local area network (LAN), any combination thereof, and the like.

The database 350 of FIG. 1 may be one or more organized collections of information. In FIG. 1, the database includes one or more non-transient computer-readable storage media to store and/or maintain organized collections of information. The database may include temporary, permanent, volatile, nonvolatile, persistent, and non-persistent, etc. computer readable memory. The database may have any storage capacity, such as one or more bytes, kilobytes, megabytes, gigabytes, terabytes, petabytes, exabytes, zettabytes, yottabytes, and so on. As should be readily apparent to a skilled artesian, the database 350 may include a single storage medium residing at a single physical location, or a plurality of storage media residing in physically separate locations.

In FIG. 1, the database 350 includes network components for connecting to and interacting through the network 200. In some embodiments, the server 300 accesses information stored in the database 350. In one example system for generating audio snippets, the database 350 includes separate collections of organized information. In this example, one logical area of the database 350 is dedicated to storing a group of audio files—which may be referred to herein as a "collection," "library," "set," and the like of individual audio files. The audio files can be composed of formatted or raw data. Examples of audio formats suitable for use include, but are not limited to, WAV, WMA, MP3, AIFF, ALC, RAW, TTA, to name a few. In this example, each audio file includes audio content and information about the audio content, which can be described as header-data, metadata, etc. The content can be any type of audio content—such as music (tacks, songs, etc.), voice clips, sound effects, and the like.

In the example from the previous paragraph, a second logical area of the database 350 is dedicated to storing data that is learned, derived, discovered, etc. about the audio files during snippet generation. In one embodiment, information describing musical stylistic similarities among the tracks in a collection of audio files is derived during snippet generation. In this embodiment, the information is stored as data and organized in the second logical area of the database 350.

The server 300 provides any type of data or information, such as files, applications, communications sessions, and the like. In some embodiments, the server 300 comprises a snippet generator. The snippet generator may be implemented as a hardware component, a software component, or any combination thereof. In one embodiment, the snippet generator includes one or more applications and/or sessions hosted by the server 300 that support the generation of audio snippets. For example, the server 300 can host a website, accessible by a client through the network 200, for browsing a library or large collection of audio files and for requesting an audio snippet from a subset of the library. The library of audio files may be stored in the database 350. In this case, the snippet generator residing on the server and receiving the client's request, accesses the audio files in the database 350, generates an audio snippet, and presents and/or transmits the audio snippet to the client.

Figure 2:
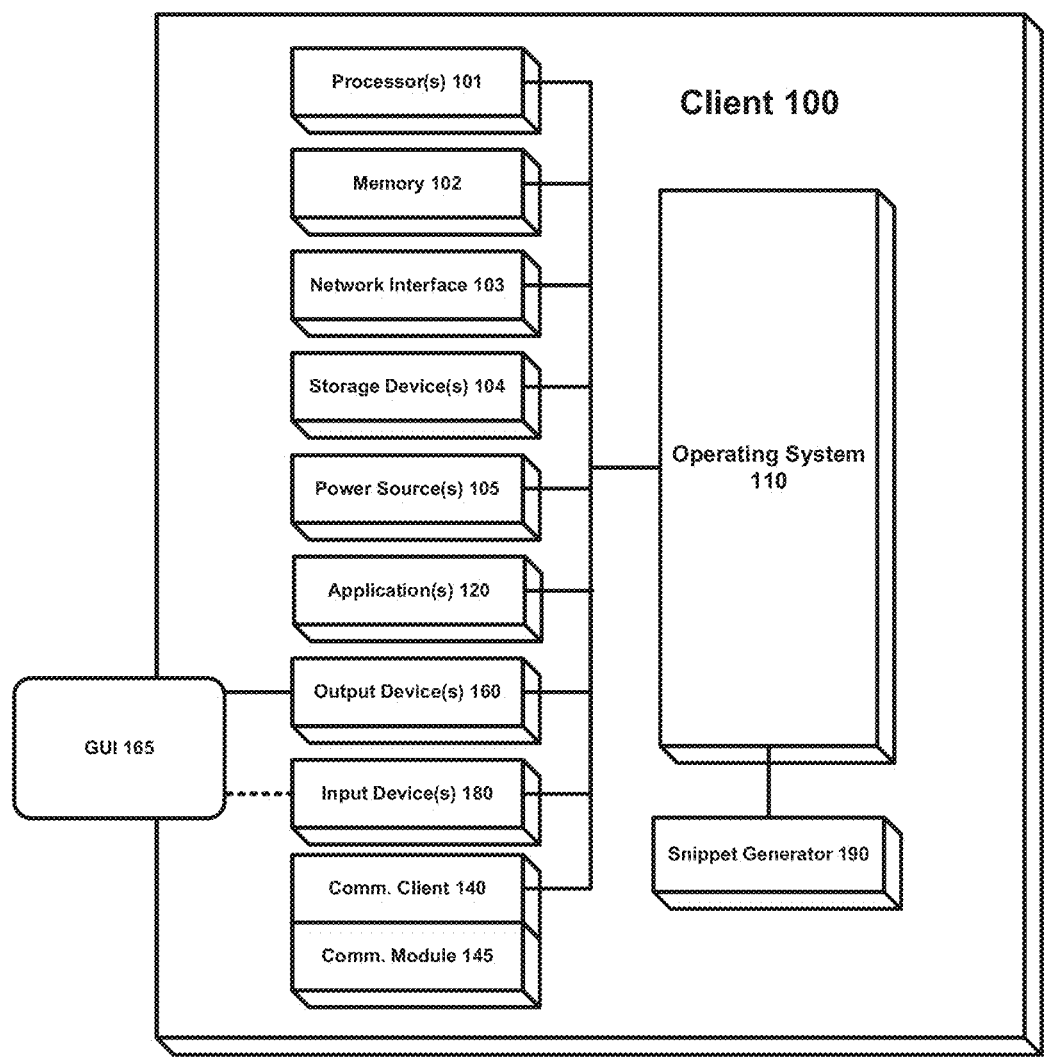
FIG. 2 is a block diagram of example components for one of the client devices of FIG. 1.

Referring now to FIG. 2, a block diagram of the components of an example client 100 of FIG. 1 is illustrated. In general, many other embodiments of the client 100 may be used as long as they support the generation of audio snippets. In the example embodiment of FIG. 2, the client 100 includes one or more processors 101, memory 102, network interface 103, one or more storage devices 104, one or more power source(s) 105, one or more applications 120, output device 160, input device 180, and snippet generator 190. The client 100 also includes an operating system 110 and a communications client 140, which includes a communications module 145, that are executable by the client 100. In a conventional fashion, each of components 101-105, 110, 120, 140, 145, 160, 180, and 190 are interconnected physically, communicatively, and/or operatively for inter-component communications.

As illustrated, the processor(s) 101 are configured to implement functionality and/or process instructions for execution within the client 100. For example, the processor(s) 101 execute instructions stored in the memory 102 or instructions stored on the storage devices 104. The memory 102, which may be a non-transient, computer-readable storage medium, is configured to store information within the client 100 during operation. In some embodiments, the memory 102 includes temporary memory, e.g., an area for information not to be maintained when the client 100 is turned off. Examples of such temporary memory include volatile memories such as random access memories (RAM), dynamic random access memories (DRAM), and static random access memories (SRAM). The memory 102 may maintain program instructions for execution by the processor(s) 101. In some embodiments the snippet generator 190, and/or the operating system 110, and/or the applications 120 are implemented as computer readable instructions or program code embodied within the memory 102.

The storage device(s) 104 also include one or more non-transient computer-readable storage media. The storage device(s) 104 are generally configured to store larger amounts of information than the memory 102. The storage device(s) 104 may further be configured for long-term storage of information. In some examples, the storage device(s) 104 include non-volatile storage elements. Non-limiting examples of non-volatile storage elements include magnetic hard discs, optical discs, floppy discs, flash memories, or forms of electrically programmable memories (EPROM) or electrically erasable and programmable (EEPROM) memories. In some embodiments the snippet generator 190, and/or the operating system 110, and/or the applications 120 are implemented as computer readable instructions or program code embodied within the storage device(s) 104.

In FIG. 2, the client 100 uses the network interface 103 to communicate with external devices via one or more networks, such as one or more wireless networks. The network interface 103 may be a network interface card, such as an Ethernet card, an optical transceiver, a radio frequency transceiver, or any other type of device that can send and receive information. Other non-limiting examples of network interfaces include Bluetooth®, 3G, 4G, satellite, and WiFi® radios in mobile computing devices, and universal serial bus (USB). In some embodiments, the client 100 uses the network interface 103 to wirelessly communicate with an external device such as the server 300 of FIG. 1, a mobile phone, or other networked computing device.

The example client 100 of FIG. 2 includes one or more power sources 105 to provide power to the device. Examples of the power source 105 include single-use power sources, rechargeable power sources, and/or power sources developed from nickel-cadmium, lithium-ion, or other suitable material.

The client 100 includes one or more input devices 180. The input device 180 is configured to receive input from a user through tactile, audio, and/or video feedback. Non-limiting examples of the input device 180 include a presence-sensitive screen, a touch screen, a mouse, a keyboard, a voice responsive system, a video camera, a microphone, or any other type of device for detecting a command from a user. In some examples, a presence-sensitive screen includes a touch-sensitive screen.

One or more output devices 160 are also included in the client 100 of FIG. 2. The output device 160 is configured to provide output to a user using tactile, audio, and/or video stimuli. The output device 160 may include a display screen (part of the presence-sensitive screen), a sound card, a video graphics adapter card, or any other type of device for converting a signal into an appropriate form understandable to humans or machines. Additional examples of the output device 160 include a speaker, a display (e.g., a cathode ray tube (CRT), a liquid crystal display, an organic light emitting diode (OLED) display, a plasma display, etc.), haptic feedback, or any other type of device that can generate intelligible output to a user.

In FIG. 2, the output device 160 may display information at a graphical user interface, such as the GUI 165. In some embodiments, a user of the client 100 can interact with the GUI 165 to send and receive information through the network. Additionally, a user of the client 100 may use the GUI 165 to interact with hardware, software, applications, and the like located on the client 100. In an embodiment, the GUI 165 includes information about one or more other devices connected to the client 100 through the network 200. The GUI 165 may also include notifications of events and other information relevant to the user of the client 100.

The application(s) 120 provide the client 100 with a variety of functionality. Generally, application(s) 120 employ the output device 160 to display information at a graphical user interface (GUI) 165 and the input device 180 to accept and respond to user input. The application(s) 120 may include, but are not limited to, a communications client (such as an email client, an instant messaging client, a text messaging client, a video conferencing client, an Internet or web browser, a telephone client), games, word processors, presentation software, media players, calendars, a database application, and/or the like. In some embodiments, the snippet generator 190 of FIG. 2 is an application 120. Application(s) 120 may execute media files, tasks, and the like.

The client 100 of FIG. 2 also includes the communications client 140 for sending and receiving data over the network 200. Examples of the communications client 140 include, but are not limited to, an email client, an instant messaging client, a text messaging client, a video conferencing client, an Internet or web browser, a telephone application, and the like. In some embodiments, the communications client 140 may be considered one or more applications 120. In other embodiments, one or more applications 120 may be considered a communications client 140.

In FIG. 2, the communications client 140 includes a communications module 145 that enables output device 160 to display information at the GUI 165. The communications module 145 also enables the communications client 140 to connect to the network 200, allowing the user of the client 100 to send and receive data, communicate with other networked devices, and the like. The communications module 145 may be a network module that connects the client 100A to a network—such as the network 200—using network protocol techniques including, by way of example, transmission control protocols and Internet protocols. The communications client 140 and/or the communications module 145 may be coupled to and interact with the network interface 103 to communication through the network 200.

In some embodiments, the data exchanged between the communications client 140 and other devices on the network 200 is optimized based, at least in part, on the hardware and/or software capabilities of the client 100. For example, if the client 100 is a mobile device connecting, e.g., to the server 300 by way of a bandwidth limited path such as a cellular network, the server 300 may optimize the number and quality of the audio, video, text, and/or other information sent to the client 100. In this example, the communications client 140 may dynamically adjust the bit rate required to send the information to the server 300 by, for example, reducing the quality of the audio, video, text, and/or other information being sent to the server 300.

The client 100 includes an operating system 110 such as the Android® operating system. The operating system 110 controls operations of the components of the client 100. For example, the operating system 110 facilitates the interaction of the communications client 140 with the processor(s) 101, memory 102, network interface 103, storage device(s) 104, the power source 105, the applications 120, the input device 180, and the output device 160. As mentioned, the communications client 140 includes the communications module 145. Each of the communications client 140 and the communications module 145 typically includes program instructions and/or data that are executable by the client 100. For example, in one example embodiment communications module 145 includes instructions causing the communications client 140 executing on the client 100 to perform one or more of the operations and actions described in the present disclosure.

In some example embodiments, the applications 120, the communications client 140, and/or the communications module 145 form a part of the operating system 110 executing on the client 100. In other embodiments, the communications client 140 receives input from one or more of the input devices 180 of the client 100. In some embodiments the operating system 110, and/or the application(s) 120, and/or the communications client 140 are implemented as computer readable instructions or program code embodied within one or more non-transient computer readable storage mediums.

In FIG. 2, the client 100 includes a snippet generator 190. In some embodiments the snippet generator 190 interacts with the operating system 110 and the other components of the client 100 to generate one or more audio snippets from a collection of audio files and/or tracks stored on the client 100 (e.g., in memory 102 and/or the storage device(s) 104). Techniques for generating audio snippets are described in detail below. The snippet generator 190 may be implemented as a hardware component, a software component, or any combination thereof.

Figure 3:
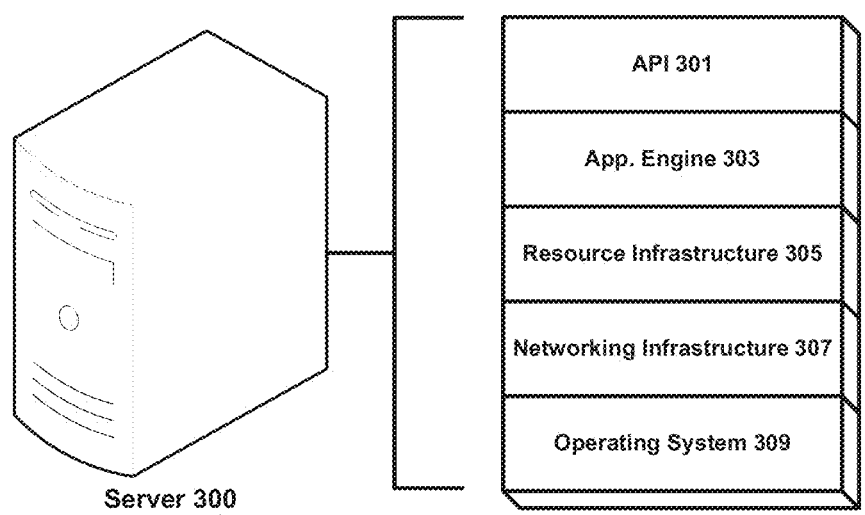
FIG. 3 is a block diagram of an example server that supports the generation of audio snippets, such as the server of FIG. 1.

Referring to FIG. 3, in one embodiment, an application programming interface (API) 301 of an application engine or app engine 303 provides many resources to an application or session (e.g., Internet session, communications session, etc.) hosted by the server 300 of FIG. 1. In turn, the app engine 303 depends on resources provided from an API exposed by a resources infrastructure layer 305 and a networking layer 307, which are supported by the server 300 and their operating system(s) 309. The app engine 303 and the resource infrastructure layer 305 connect requests, e.g., HTTP, from a client to an application or session hosted by the server 300. The app engine 503 also provides a runtime environment for applications and sessions hosted by the server 300. Administrative support for applications and sessions hosted by the server 300 may be provided by a mechanism in the app engine 303. The app engine 303 also provides access to a database in the resource infrastructure layer 305 for persistent storage requirements.

Through its API 301, the app engine 303 provides the applications and sessions hosted by the server 300 access to resources on the Internet, such as web services or other data. The app engine 303 retrieves web resources using the resource infrastructure layer 305. Applications and sessions hosted by the server 300 may send and receive messages using the app engine 303 and the resource Infrastructure Layer 305. The app engine 303 and the resource infrastructure layer 305 also supports a cache, which is useful for temporary data or data copied from the datastore to the cache for high-speed access. The resource infrastructure layer 305 also supports a file system and scheduling resources.

Figure 4:
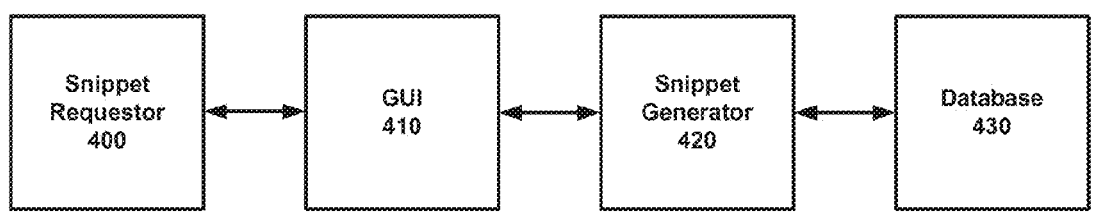
FIG. 4 is a block diagram of an example system for generating audio snippets.

Turning to FIG. 4, a system for generating audio snippets is illustrated. The system includes a snippet requestor 400, a GUI 410, a snippet generator 420, and a database 430. The snippet requestor 400 may be the user 10, the client 100, or an appliance for automatically requesting the generation of an audio snippet by identifying a collection (or set) of audio files and transmitting a request for an audio snippet from the collection, which is described in more detail below.

Figure 5:
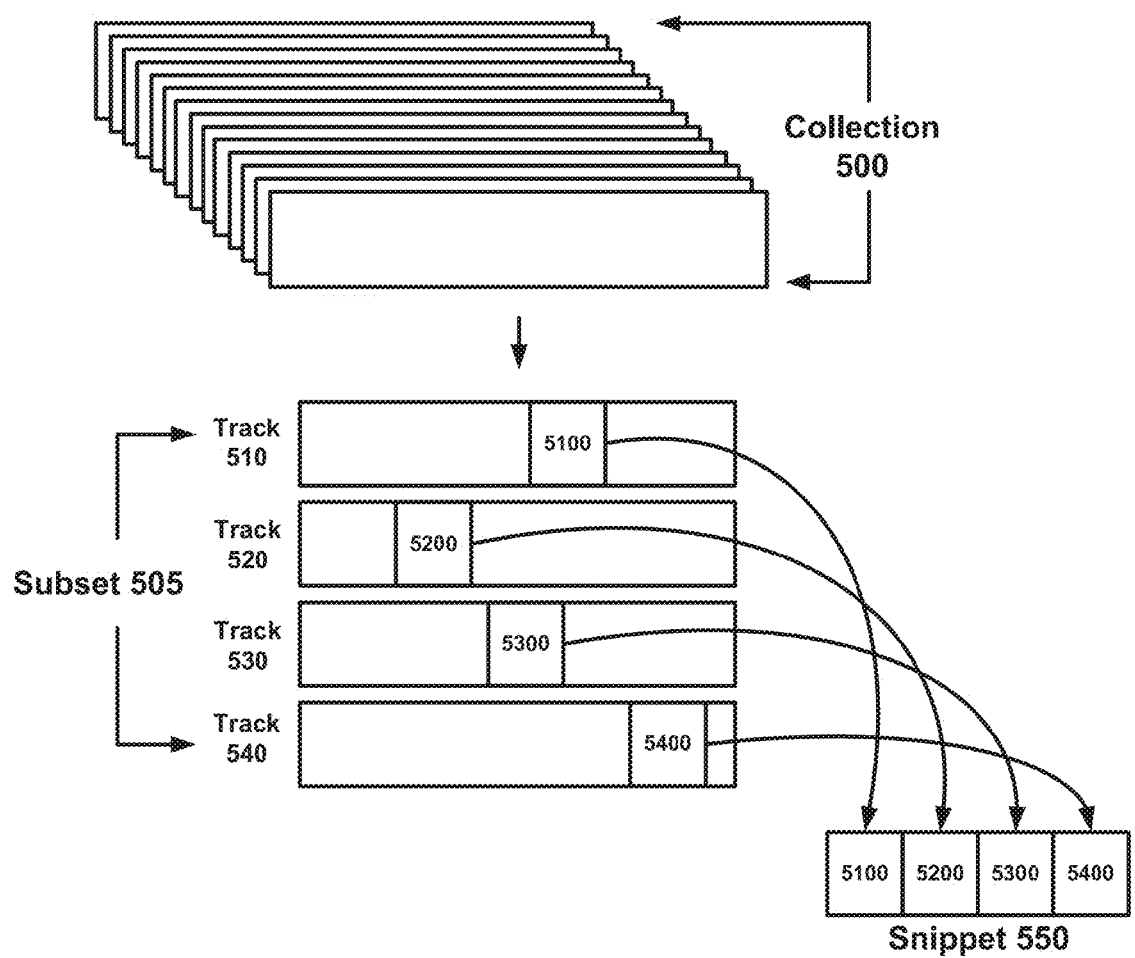
FIG. 5 is a block diagram illustrating an example snippet.

FIG. 5 depicts an example of a set of files or tracks—collection 500—that is identified in a snippet request. As mentioned, audio files may include musical tracks or songs. In this case, the collection 500 may be the files, and/or tracks, and/or songs associated with or comprising a playlist, such as a user playlist. For example, the user 10A in FIG. 1 may create a list of favorite songs, e.g., a playlist, on a client 100A, and request an audio snippet from the created list. As another example, the collection 500 can be a collection of musical works from a particular artist, a collection of musical works from a particular musical style or genre, and the like. Thus, a collection of audio files representing the collective work of Mozart may be used to create an audio snippet. Alternatively, the collection 500 represents tracks from the classical music genre. As another example, a collection of audio files representing the work of an artist or a genre in a given time period, e.g., from the year 1975 to the year 1980, is used to create an audio snippet.

FIG. 5 also illustrates an example audio snippet 550 generated from audio tracks 510, 520, 530, and 540. As will be discussed later, the audio tracks 510-540 comprise a subset 505 of audio tracks intelligently selected from a collection (or set) of audio files 500. A segment, such as segment 5100 of track 510, represents a portion of a track. A portion may be a temporal portion, but is not limited thereto. As an example, the track 510 is a 60 second audio clip and the segment 5100 is a 10 second portion of that audio clip. A segment may represent any portion or duration of a track and may be selected from any location (e.g., beginning, middle, end, and anywhere in-between) in the track. In the example of FIG. 5, a snippet generator extracts segment 5100 from track 510, segment 5200 from track 520, segment 5300 from track 530, and segment 5400 from track 540 and combines the segments into audio snippet 550. In FIG. 5, the segment 5200 is concatenated to segment 5100, segment 5300 is concatenated to segment 5200, and so on. However, the segments 5100-5400 may be combined in any desired order. Additionally, in some embodiments, the segments 5100-5400 are of the same or different duration. Techniques for selecting the appropriate subset 505 from a collection of audio files 500, and the appropriate segments 5100-5400 from the tracks 510-540, respectively, to form the snippet 550 are described below.

Returning to FIG. 4, the snippet requestor 400 interacts with the GUI 410 to generate and/or transmit the request to the snippet generator 420. As mentioned, the request identifies the set of files used to generate the snippet. Upon receiving the request, the snippet generator 420 generates the snippet by accessing and analyzing audio files comprising the collection (or set) identified in the request. In FIG. 4, the collection may be stored in database 430. In the example that follows, each file in the collection is an audio file comprising a musical track and the audio snippet is a combination of segments from each musical track in a subset of the audio files in the collection.

Once a snippet request is received, the snippet generator 420 extracts audio features from each track in the collection of audio files identified in the request. Examples of audio features include, but are not limited to, time and frequency domain features such as energy envelope and distribution, frequency content, harmonicity, spectral flux, and pitch. A stabilized auditory image (SAI) is another example of an audio feature. Additional examples of an audio feature include audio features that are sensitive to musical beat and rhythm, such as autocorrelation and the output of beat tracking algorithms. In some embodiments, features include mel-frequency cepstral coefficients representing a short-term power spectrum of sound. Any technique for extracting audio features may be used.

One example of extracting audio features from an audio track involves partitioning the track into frames of short duration (e.g., 50 milliseconds). An audio image, such as a stabilized auditory image (SAI), is generated for each frame, and used to calculate a dense vector feature for each frame. These dense vector features are subjected to vector quantization into a vector quantization codebook using, e.g., a winner-take-all algorithm. Thereafter, a histogram for the track is generated by summing across all of the vector quantization codes for all the frames. In this example, a histogram is generated for each track in the collection of audio files.

Figure 6:
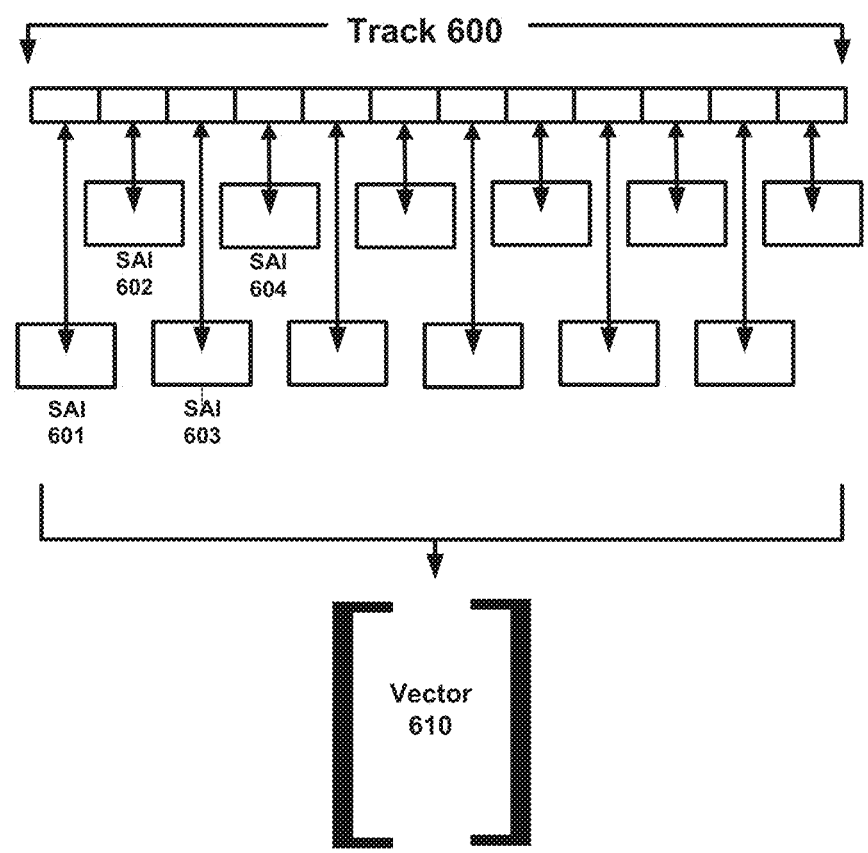
FIG. 6 is an example block diagram illustrating extracting features from a track.

As illustrated in FIG. 6, extracted features may be expressed as a vector representation of audio. In FIG. 6, a track 600 is partitioned into frames, and a SAI is generated for each frame (such as SAIs 601-604). The SAIs are processed to generate a vector representation (vector 610) of the track 600.

Returning to FIG. 4, the snippet generator 420 determines, based on the features extracted from the tracks, similarities—such as musical stylistic similarities—among the tracks in the collection. Other similarities, such as artist, album, genre, instrumentation, time period, label, producer, production quality, production origin (e.g., live or studio), and song length may be used as well. Any suitable technique for determining track-to-track similarity may be employed. For example, a supervised learning model, such as the Wsabie algorithm, may be used to capture musical stylistic similarities on a track-by-track basis. That is, each track in the collection may be compared to each other track in the collection to measure similarities.

The Wsabie algorithm—an example of a supervised learning model—learns from training data to produce a ranked list of similar items based on a query item. Features, such as the audio features described above, are projected into a new numerical space of the appropriate dimensionality (e.g., 100) referred to as an "embedding." A projection is accomplished using a matrix of weights that are adapted such that musically-similar items are near one another in the embedding space. Any distance function, such as vector dot product (correlation) or cosine distance (vector distance), can be used to compare items in the embedding space. The effect of using the Wsabie algorithm is that the raw audio feature space is warped to capture similarities found in the training data.

In the example previously described, where audio features are extracted and a track-level histogram is generated for each track in the collection, a supervised learning model may be used to transform the track level histograms into a dense space (e.g., 100-dimensional space) which captures similarities.

Information or data describing the determined similarities is organized and maintained so as to be available to access and use. In this manner, a library of similarity data, expressing track-to-track similarities, may be generated and maintained. In the example of FIG. 4, the similarity data may be organized and maintained in the database 430. In some cases, the similarity data for each track is stored in a database keyed by a track identifier of the track corresponding to the data. Alternatively, similarity data for a given track is added as metadata to the audio file corresponding to the track.

After determining the track-to-track similarities, the snippet generator 420 selects or identifies the most diverse and highest quality subset of tracks from the collection provided in the request. Diversity among the tracks in a collection of audio files is measured by analyzing the similarity data. In one embodiment, determinantal point processes (DPPs) are employed to select the most diverse and highest quality subset of tracks from the collection of audio files. Given a set of objects, where the quality of each object and the similarity between all possible pairs of objects in the set are known, DPPs provide a framework for choosing a diverse and high quality subset of the objects. DPPs are grounded in probabilistic principles and are used to compute conditional distributions that are useful when making inferences. Additionally, it is possible to learn and use parameters established by DPPs, such as parameters for the optimal weighting of quality and similarity features.

In some embodiments, quality is associated with the popularity of a track. Popularity, in turn, may be measured by the number of times an audio file or track is executed (played) on a media player, downloaded and/or purchased from a service or website, and the like. The popularity of a track may also be indicated by ratings, such as user ratings, of the track. All other techniques for measuring an audio track's popularity are within the scope of this disclosure.

Once the most diverse and highest quality subset of tracks is determined, the snippet generator 420 selects a portion or segment from each track in the subset and combines the portions into an audio snippet. In one embodiment, each segment used to form the snippet is of a predetermined duration (such as ten seconds) and from a predetermined location (such as the temporal middle) of the track. Thus, a ten second segment from the middle of each track may be used to generate the snippet in this example. As should be apparent to the ordinarily skilled artisan, a segment of any duration from any location may be selected from an audio track. Additionally, the selected segments may be combined in any manner or order. The example of FIG. 5 illustrates joining segments 5100-5400 to form snippet 550 by concatenation. However, other techniques are within the scope of this disclosure.

In another example, a segment used to form a snippet is identified by detecting a event in the track. The event may be a musical event, such as a given set of lyrics, a crescendo or decrescendo, a certain beat or harmony, a riff, or a chorus to name a few. For example, techniques for identifying riffs in music can be used to determine appropriate segments to combine into an audio snippet. As another example, the event may be a word, phrase, sentence, expression, and the like in an audio track of a speech.

In some embodiments, the system for generating audio snippets is implemented in a networked environment, such as the environment of FIG. 1. In these embodiments, the snippet requestor 400 includes the user 10 and/or the client 100, the GUI 410 includes the GUI 165 of the client 100, the snippet generator 420 includes an application hosted by and residing at the server 300, and the database 430 includes the database 350—all of which are connected to and interact through the network 200. In these embodiments, the GUI may be provided by an Internet browser (executing on the client) accessing a website (hosted by the server) for browsing audio files, generating audio snippets, and the like. The snippet generator resides on the server and interacts, e.g., through the network, with the database to generate the snippet, and with the client to receive requests and present or transmit snippets. In this case, the files used to create a snippet are maintained the database or the server.

In other embodiments, the system for generating audio snippets is implemented in a client, such as client 100 of FIGS. 1-2. In these embodiments, the snippet requestor 400 includes the user 10 and/or the client 100, the GUI 410 includes the GUI 165 of the client 100, and the snippet generator 420 includes the snippet generator 190 of the client 100. In these embodiments, the GUI may be an application interface of an application residing on the client 100. Additionally, the database may include one or more applications (such as the applications 120 of FIG. 2) and one or more computer readable storage media (such as the memory 102 and/or the storage device(s) 104) of the client 100 of FIG. 2. In this case, the snippet generator and the files used to form a snippet reside on the client.

In yet another embodiment, the some components of a system for generating audio snippets are implemented in a networked environment while other components are implemented on a client. For example, a snippet generator residing on a client may access a collection of audio files on database or server through a network to generate an audio snippet. As another example, a snippet generator residing on a client may access a database of similarity data through a network, download similarity data associated with a given set of tracks stored on the client, and employ the similarity data to generate a snippet from the tracks stored on the client. As should be apparent, the various components of the system for generating audio snippets presented in this disclosure may be distributed over a network or centrally located without limitation and without deviating from the desired result, i.e., the generation of one or more audio snippets.

Figure 7:
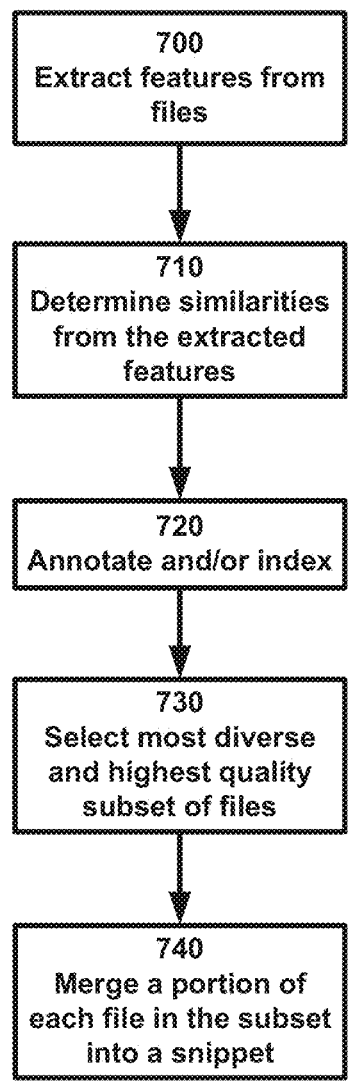
FIG. 7 is a flow diagram of an example method for generating audio snippets.

FIG. 7 is a flow diagram of an example method for generating audio snippets.

Step 700: Extract Features from Files.

The process begins at step 700. Given a collection of files, such as a collection of audio files or audio tracks, features are extracted from each file in a collection. In some situations, the features are audio features which may include, but are not limited to, an SAI, time and frequency domain features (e.g., energy envelope and distribution, frequency content, harmonicity, spectral flux, and pitch), etc. Any technique for extracting features may be used.

Step 710: Determine Similarities from the Extracted Features.

Once the features are extracted in step 700, the process moves to step 710. Here, similarities, such as musical stylistic similarities, among the files in the collection are identified. Other similarities, such as artist, album, genre, instrumentation, time period, label, producer, production quality, production origin (e.g., live or studio), and song length may be used as well. Any suitable technique for determining file-to-file similarity may be employed. For example, a supervised learning model—such as the previously described Wsabie algorithm—may be used to capture musical stylistic similarities on a file-by-file basis. That is, each file in the collection may be compared to each other file in the collection to measure similarities.

Step 720: Annotate and/or Index.

Following step 710, similarity information or data corresponding to each file is organized, indexed, and maintained so that it may be accessed for further use. In one example, the similarity data is maintained in a database keyed by a file identifier of the file corresponding to the data. Alternatively, the similarity information derived for a given file may be associated with, stored in, added to, linked to, embedded within, etc. the file. Thus, the file may be annotated with the similarity information.

Step 730: Select Most Diverse and Highest Quality Subset of Files.

After determining the file-to-file similarities in step 720, the most diverse and highest quality subset of files from the collection is identified. Diversity among the files is determined by analyzing the similarity data. DPP techniques, as mentioned above, may be employed in step 730. Regarding quality, in some embodiments quality is associated with the popularity of a file. Popularity, in turn, may be measured by the number of times the file is used, accessed, downloaded, purchased, and the like. Popularity may also be indicated by a rating system, such as a user rating system. All other techniques for measuring an popularity are within the scope of this disclosure.

Step 740: Merge a Segment of Each File in the Subset into a Snippet.

A portion or segment from each file in the subset (determined in step 730) is selected. Thereafter, the selected portions are merged into a snippet. In some embodiments where the size or length of the files can be measured temporarily, each segment used to form the snippet may be a predetermined duration (such as ten seconds) and from a predetermined location (such as the temporal middle) of the file. In these embodiments, any duration from any location may be selected for each file (see e.g., FIG. 5 where segments from different locations are selected). Additionally, the selected segments may be merged in any manner or order. In another example, a segment used to form a snippet is identified by detecting a event in the file.

Once a snippet is generated it can be presented, transmitted, viewed, consumed, listened to, saved, stored, and so on based on the type of snippet and its desired use. Additionally, a snippet may be generated in real-time or generated and stored for later use. For example, once a snippet is generated, the snippet may be indexed and maintained in a database. Thus, if two requests for a snippet from the same collection of files is received, the later of the two requests may be satisfied by accessing the previously generated snippet in the database.

While the aspects and techniques of the disclosure have described generating an audio snippet from a collection of audio files, the disclosure is not limited thereto. The aspects and techniques described herein may be employed to generate a snippet from any collection, such as a collection of video files, a library of documents (such as literary works), and the like.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Embodiments of this invention are described herein, including the best mode known to the inventors for carrying out the invention. Variations of those embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A method, comprising:
   identifying a set of audio files, wherein the audio files in the set of audio files have at least one common attribute, wherein the set of audio files includes different songs from a common musical artist;
   selecting a subset of audio files from the set of audio files, wherein selecting an audio file to be included in the subset of audio files is based on one or more of (i) a number of times the audio file is downloaded, (ii) a number of times the audio file is purchased, and (iii) a number of times the audio file is played by a media player;
   detecting a musical event in each audio file in the subset of audio files;
   for each audio file in the subset of audio files, selecting an audio segment from the audio file based on the detected musical event in the audio file; and
   generating an audio sequence based on arranging the audio segments from the audio files in the subset of audio files.

2. The method of claim 1, further comprising generating similarity data for each audio file in the set of audio files, the similarity data indicating musical stylistic similarities between each audio file in the set of audio files and each other audio file in the set of audio files.

3. The method of claim 2, wherein, for a first audio file in the set of audio files, the similarity data generated for the first audio file is associated with the first audio file as metadata corresponding to the first audio file.

4. The method of claim 2, wherein the similarity data is a similarity matrix.

5. The method of claim 2, wherein selecting an audio file to be included in the subset of audio files is further based on a diversity of the audio file, the diversity of the audio file based on the similarity data corresponding to the audio file.

6. The method of claim 1, wherein selecting an audio file to be included in the subset of audio files is further based on a measure of popularity of the audio file, wherein the measure of popularity of the audio file is based on user-provided ratings of the audio file.

7. The method of claim 1, wherein generating the audio sequence comprises concatenating the selected audio segments into the audio sequence.

8. A system, comprising:
   one or more storage devices storing audio files; and
   a processor configured to:
      identify a set of audio files stored in the one or more storage devices, wherein the audios files in the set of audio files have at least one common attribute, wherein the set of audio files includes different songs from a common musical artist;
      select a subset of audio files from the set of audio files, wherein selecting an audio file to be included in the subset of audio files is based on one or more of (i) a number of times the audio file is downloaded, (ii) a number of times the audio file is purchased, and (iii) a number of times the audio file is played by a media player;
      detect a musical event in each audio file in the subset of audio files;
      for each audio file in the subset of audio files, select an audio segment from the audio file based on the detected musical event in the audio file; and
      generate an audio sequence based on arranging the audio segments from the audio files in the subset of audio files.

9. The system of claim 8, wherein the processor is included in a server device coupled to a network, and wherein server is configured to receive a request to generate the audio sequence over the network from a client device in communication with the server via the network.

10. The system of claim 8, wherein the processor is further configured to generate similarity data for each audio file in the set of audio files, the similarity data indicating musical stylistic similarities between each audio file in the set of audio files and each other audio file in the set of audio files.

11. The system of claim 10, wherein, for a first audio file in the set of audio files, the similarity data generated for the first audio file is associated with the first audio file as metadata corresponding to the first audio file.

12. The system of claim 8, wherein selecting an audio file to be included in the subset of audio files is further based on a diversity of the audio file, the diversity of the audio file based on the similarity data corresponding to the audio file.

13. The system of claim 8, wherein selecting an audio file to be included in the subset of audio files is further based on a measure of popularity of the audio file, wherein the measure of popularity of the audio file is based on user-provided ratings of the audio file.

14. The system of claim 8, wherein generating the audio sequence comprises concatenating the selected audio segments into the audio sequence.

* * * * *